UNITED STATES PATENT OFFICE.

ALEX B. DAVIS, OF INDIANAPOLIS, INDIANA, ASSIGNOR TO THE ELI LILLY AND COMPANY, OF INDIANAPOLIS, INDIANA, A CORPORATION OF INDIANA.

COMBINATION OF ORGANIC ACIDS.

1,203,500.  Specification of Letters Patent.  Patented Oct. 31, 1916.

No Drawing.  Application filed July 26, 1915.  Serial No. 41,908.

*To all whom it may concern:*

Be it known that I, ALEX B. DAVIS, a citizen of the United States, residing at Indianapolis, Marion county, and State of Indiana, have invented and discovered certain new and useful Improvements in Combinations of Organic Acids, of which the following is a specification.

My invention relates to an ester of salicylic acid and 2-phenyl-quinolin-4-carboxylic acid. The compound is a valuable therapeutic agent. It is produced by treating a solution of salicylic acid with the chlorid of 2-phenyl-quinolin-4-carboxylic acid either with or without the addition of a tertiary base. The preparation may be made as follows:

2-phenyl-quinolin-4-carboxylic acid is treated with somewhat more than one molecular proportion of thionyl chloride of the formula $SOCl_2$. Sulfur dioxid escapes and the hydrochlorid of the acid chlorid of the formula

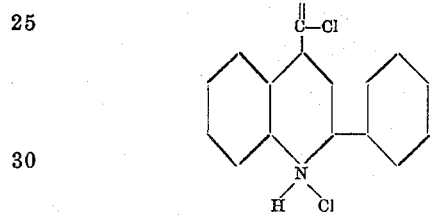

remains as a yellow mass. This is broken up, suspended in dry benzol, an equimolecular proportion of salicylic acid added and the mass boiled under a reflux condenser several hours. The benzol is then evaporated, the resulting yellow mass treated with water, filtered, washed, dried and ground to a powder.

The ester may also be made as follows: The quinolin acid chlorid is suspended in benzol, an equimolecular proportion of salicycle acid added and then somewhat more than one molecular proportion of pyridin or some other tertiary base which can take up the hydrochloric acid liberated during esterification. The mass is boiled a short time under a reflux condenser, the benzol evaporated, the resulting dry yellow mass treated with water, ground up, washed well on a filter and dried. The ester has the probable constitution:

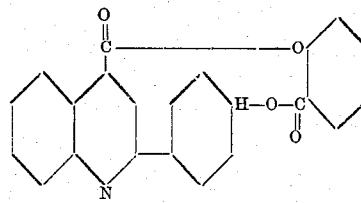

What I claim is:

1. An ester of a quinolin 4 carboxylic acid and salicylic acid.

2. An ester of salicylic acid and 2-phenyl-quinolin-4-carboxylic acid.

3. A compound of the formula

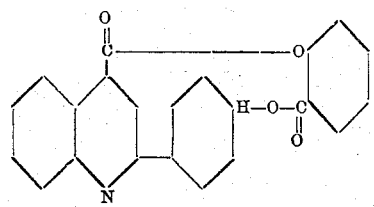

4. The process of treating a quinolin-4-carboxylic acid with thionyl chlorid and combining salicylic acid therewith.

5. The process of producing an ester of salicylic acid with 2-phenyl-quinolin-4-carboxylic acid by treating 2-phenyl-quinolin-4-carboxylic acid with thionyl chlorid and combining the resulting chlorid with salicylic acid.

6. The process of producing compounds of 2-phenyl-quinolin-4-carboxylic acid and salicylic acid which consists in forming the chlorid of 2-phenyl-quinolin-4-carboxylic acid and combining this with salicylic acid.

In witness whereof, I have hereunto set my hand and seal at Indianapolis, Indiana, this 21st day of July, A. D. nineteen hundred and fifteen.

ALEX B. DAVIS. [L. S.]

Witnesses:
A. C. RICE,
E. C. CLEMENTS.